United States Patent
Hohsho et al.

[15] 3,669,423
[45] June 13, 1972

[54] CARBURETOR

[72] Inventors: Yukio Hohsho, Katsuta; Koichiro Yamada, Hitachi; Yoshishige Oyama, Hitachi; Takao Teranishi, Hitachi; Seikou Suzuki, Hitachi, all of Japan

[73] Assignee: Hitachi, Ltd., Tokyo, Japan

[22] Filed: May 20, 1970

[21] Appl. No.: 39,076

[30] Foreign Application Priority Data

May 21, 1969 Japan....................................44/38734

[52] U.S. Cl..........................261/36 A, 261/69 R, 137/81.5, 123/119 R
[51] Int. Cl.........................................................F02m 69/04
[58] Field of Search.......................261/DIG. 69, 36 A, 69 R; 137/81.5; 123/119 R

[56] References Cited

UNITED STATES PATENTS

| | | | |
|---|---|---|---|
| 3,389,894 | 6/1968 | Binder | 261/DIG. 69 |
| 3,574,346 | 4/1971 | Sulich | 261/DIG. 69 |
| 3,392,739 | 7/1968 | Taplin et al. | 261/DIG. 69 |
| 3,541,865 | 11/1970 | Brown | 137/81.5 |
| 3,361,416 | 1/1968 | Morgan et al. | 261/69 R |
| 3,577,964 | 5/1971 | Lazar | 261/DIG. 69 |
| 3,386,709 | 6/1968 | Drayer | 261/DIG. 69 |
| 3,477,699 | 11/1969 | Drayer | 261/DIG. 69 |
| 3,548,795 | 12/1970 | Howland | 261/DIG. 69 |
| 3,544,082 | 12/1970 | Fort et al. | 261/DIG. 69 |

*Primary Examiner*—Tim R. Miles
*Attorney*—Craig, Antonelli & Hill

[57] ABSTRACT

A carburetor capable of suitably controlling the fuel flow rate over the entire operational range of the associated engine using a three-dimensional-type fluidic device.

5 Claims, 7 Drawing Figures

INVENTORS
YUKIO HOHSHO, KOICHIRO YAMADA,
YOSHISHIGE OYAMA, TAKAO TERANISHI
AND SEIKOU SUZUKI

BY Craig, Antonelli, Stewart & Hill

ATTORNEYS

CARBURETOR

BACKGROUND OF THE INVENTION

Presently, various types of carburetor are being used but, on the other hand, the requirements for carburetor characteristics are becoming complicated more and more with an increasing demand for higher engine performance and an increasing demand for counter-measures for the exhaust gas problem, and these requirements are too complicated to be met by the constructions of the presently used carburetors. On the other hand, the addition of various supplementary devices to meet such requirements creates an economical problem. Then, it can be considered to satisfy the aforesaid requirements by applying to a carburetor a fluidic logical device which has been developed as means for precisely controlling the flow rate of fluid.

The fluidic logical devices presently being used for practical applications are mostly of pseudo-two dimensions. Namely, they are of the type wherein fluid passages are formed by providing grooves between flat plates and a control pressure is acted at the branched portion through a control passage. However, in such type of fluidic logical device wherein fluid is confined within two dimensional planes, when a liquid is used as a fluid to be controlled, a divergent current of the liquid flowing along the wall surface of the channel on this side of the branched portion is relatively large in quantity during operation and a precise fluid control can hardly be obtained when the value of control pressure is small. In addition, if a high negative pressure acts on the control pipe, the divergent current is sucked into said control pipe and the liquid is accumulated within the control pipe, providing a cause of hysteresis and causing an irregularity in flow control.

Besides the type described above, a fluidic logical device of three-dimensional-type is also known wherein the fluid control space is made three-dimensional. According to this type, the phenomenon of the fluid attaching to the wall of the control chamber can be eliminated and it is considered that the device of this type can be used in an equipment wherein the control pressure or flow rate change is large. However, by employing such principle construction only of the fluidic device in a carburetor, it is impossible to produce economically a carburetor which will satisfy the flow control requirement over the entire operational range of engine.

As the reasons therefor, the following may be considered. Namely, in controlling the flow rate by means of a fluidic device of the type wherein the control pressure varies continuously, the flow rate $Qf$ of fuel to be supplied to the engine varies generally in proportion to the control negative pressure $P$ as shown in FIG. 1. On the other hand, the flow rate $Qf$ of fuel to be supplied to the engine must basically be in proportion to the flow rate $Qa$ of suction air as represented by a curve $a$ in FIG. 2. However, the Venturi negative pressure $P_B$ of the carburetor varies relative to the suction air quantity $Qa$, in the relation $P_B = KQa^2$ as shown in FIG. 3. Therefore, if the Venturi negative pressure $P_B$ only is utilized as the control pressure, there will be the relation as represented by a curve $b$ of FIG. 2, between $Qa$ and $Qf$. Namely, with only one fluidic element, it is impossible to maintain a suitable relation between the suction air quantity and the fuel flow rate over the entire operational range of the engine, and it is necessary to use a plurality of elements or to correct the relationship between the air flow rate and the control pressure.

In the idling of an engine wherein the engine suction air quantity is relatively small, it is practically difficult to precisely control the suction air quantity. This is because, when the engine r.p.m. is small, the variation in the Venturi negative pressure relative to the flow rate of suction air is relatively large and hence the rotation of engine becomes instable due to a fluctuation of fuel flow rate. This problem cannot be solved only by the manner in which the control negative pressure is taken.

The object of the present invention is, therefore, to provide at a low cost a carburetor, capable of providing the characteristics required over the entire operational range of engine from a low speed operation to a high speed operation, by making use of the concept of fluidic logical device controlled in a three-dimensional space. A characteristic feature of the present invention resides in the fact that a fuel flow controlling portion utilizing a fluidic logical device is provided as a three-dimensional air space which does not confine the flow of fuel, and various control pressures are acted in said air space. Another characteristic feature of the invention resides in the fact that the low speed fuel line is partially composed of a line having no fluidic logical element incorporated therein.

BRIEF DESCRIPTION OF THE DRAWINGS

FIGS. 1 to 3 are diagrams showing the general characteristics of a carburetor, in which FIG. 1 shows the relationship between the control negative pressure and the flow rate of fuel to be supplied to an engine; FIG. 2 shows the relationship between the suction air quantity and said fuel flow rate; and FIG. 3 shows the relationship between the Venturi negative pressure and the suction air quantity;

DESCRIPTION OF THE PREFERRED EMBODIMENT

Figure 1:
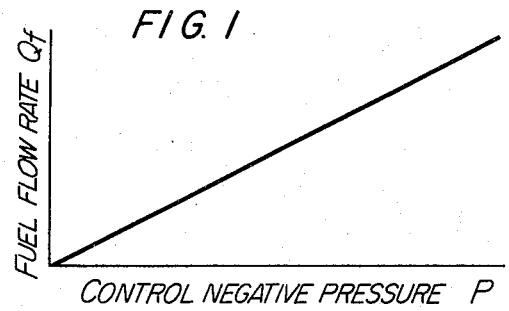
Figure 2:
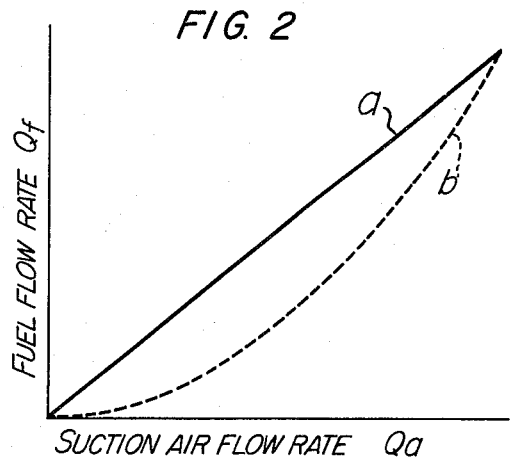
Figure 3:
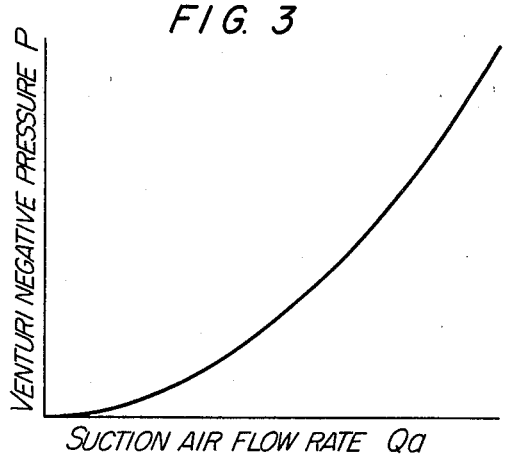
Figure 4:
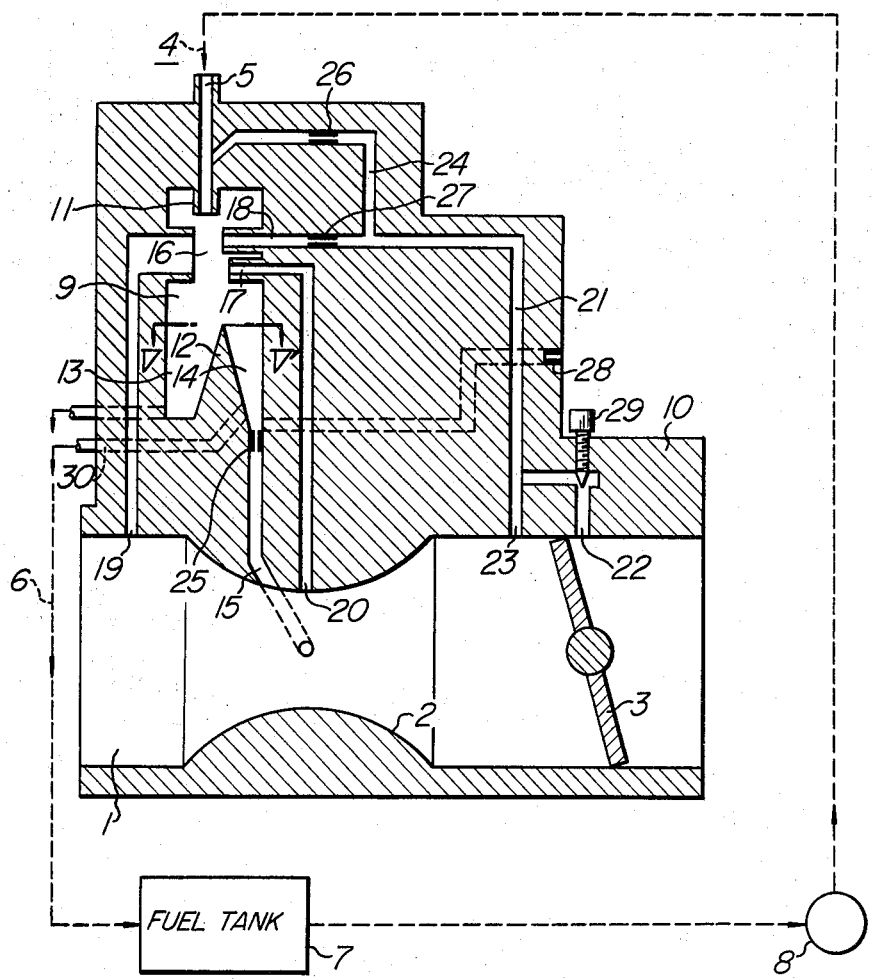
FIG. 4 is a vertical cross-sectional view of an embodiment of the carburetor according to the present invention.
Figure 5:
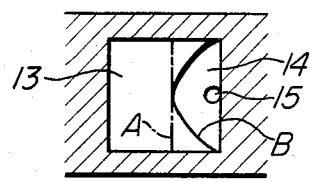
FIG. 5 is a transverse cross-sectional view taken on the line V—V of FIG. 4.

A preferred embodiment of the present invention will be described hereinafter with reference to the accompanying drawings. Referring to FIGS. 4 and 5, reference numeral 1 designates an air passage of the carburetor, in which suction air flows in the direction of the arrow, 2 a Venturi and 3 a throttle valve. Reference numeral 4 generally designates a fuel supply line for circulating fuel therethrough, which is composed of a fuel supply passage 5, a first fuel return passage 6, a fuel tank 7 and a fuel pump 8. Reference numeral 9 designates a control chamber formed interior of the carburetor body 10 and a nozzle 11 communicating with the fuel supply passage 5 is projecting into the upper portion thereof. The control chamber 9 may be formed in a control device provided separately from the carburetor body 10. Below the fuel nozzle 11 is provided a partition member 12 by which the lower portion of the control chamber 9 is divided into a fuel return reservoir 13 and a fuel supply reservoir 14. The fuel return reservoir 13 is in communication with the fuel return passage 6, while the fuel supply reservoir 14 is in communication with a fuel supply passage 15 which in turn is open into the Venturi 2. In the case where the control chamber 9 is formed in a control device provided separately from the carburetor body 10, said passage is communicated with air passage 1 of the carburetor by suitable means.

On one side of and immediately below the fuel nozzle 11 is provided a vent nozzle 16 which projects into the control chamber 9 with the axis thereof extending substantially perpendicular to the axis of said fuel nozzle 11. Opposite to the vent nozzle 16 are provided a main control nozzle 17 and an auxiliary control nozzle 18 which also project into the control chamber 9 with the axes thereof extending substantially perpendicular to the axis of the fuel nozzle 11. It will be obvious that the axes of the respective nozzles are not necessarily in perpendicular relation to each other but are only required to be in crossing relation or in adjacent relation within the control chamber 9. The vent nozzle 16 is in communication with the air passage 1 at a point upstream of the Venturi 2, through a vent passage 19. On the other hand, the main control nozzle 17 is in communication with the Venturi 2 through a control passage 20 and the auxiliary control nozzle 18 is communicated through a low speed fuel passage 21 with an idle port 22, open into the air passage 1 at a point immediately downstream of the throttle valve 3, and with a by-pass port 23 open into the air passage 1 at a point immediately upstream of said throttle valve 3. The low speed fuel passage 21 is further communicated with the fuel passage 5 through a low speed fuel passage 24. Reference numeral 25 designates a main restriction, 26 an idle restriction, 27 an auxiliary air restriction, 28 an air bleed and 29 an idle adjusting screw. The fuel supply reservoir 14 is also communicated with the fuel tank 7 through a second fuel return passage 30 to return a part of fuel to said fuel tank.

The degrees of projection into the control chamber 9, the diameters and the relative position of the fuel nozzle 11, the vent nozzle 16 and the main and auxiliary control nozzles 17, 18 are preferably determined through experiments. It is only important to select these factors such that the fuel will not be attached to the wall of the control chamber 9 and the fuel flow rate can easily be controlled and further the fuel will not be sucked from the main and auxiliary nozzles 17, 18.

The control chamber 9 may be rectangular in the cross-sectional shape, for example, as shown in FIG. 5 and the line of the top edge of the partition member 12 may be straight as indicated by the chain line A. Alternatively, the line of the top edge of the partition member 12 may be curved as indicated by the solid line B, as required.

With the construction described above, when the engine is not in operation or, in other words, when there is no Venturi negative pressure, the fuel ejected from the fuel nozzle 11 flows into the fuel return reservoir 13 in its entirety due to the presence of the partition member 12 and returns to the fuel tank 7. When the engine has been started, a negative pressure develops in the vicinity of the idle port 22 and thence acts in the fuel passage 5 through the low speed fuel passages 21 and 24. Therefore, the fuel flows into the low speed fuel passage 21 from the fuel passage 5 through the low speed fuel passage 24 and is mixed with the air sucked through the auxiliary control nozzle 18. The resultant fuel-air mixture is supplied into the engine through the idle port 22 and the air passage 1. The negative pressure acting in the auxiliary control nozzle 18 simultaneously causes an air flow from the vent nozzle 16 into said auxiliary control nozzle 18. This air flow collides against the jet of fuel being ejected through the fuel nozzle 11 and changes the direction of said jet of fuel, so that the jet of fuel is divided by the partition member 12 into two fuel flows, one of which is directed into the fuel supply reservoir 14 and supplied into the air passage 1 through the main fuel passage 15. The ratio of the fuel supplied through the main fuel passage 15 to the total quantity of the fuel supplied under such condition is about 50 percent or lower. As stated, at the start and during idling of the engine, the quantity of fuel supplied to the engine is controlled mainly by the low speed fuel passage 21 which has a relatively stable fuel flow characteristic owing to the effect of the idle restriction 26, and, therefore, is stable even if the negative pressure is fluctuated by the pulsation of engine suction.

As the opening degree of the throttle valve 3 is increased slowly from the idling state, the negative pressure acting in the idle port 22 becomes smaller but, on the other hand, a negative pressure begins to act in the by-pass port 23. Therefore, the quantity of fuel supplied through the low speed fuel passage 24 will not decrease abruptly.

The increase in opening degree of the throttle valve 3 also results in the increase of the negative pressure in the Venturi 2. This negative pressure acts to change the direction of the fuel jet through the main control nozzle 17, with the result that the quantity of fuel flowing into the fuel supply reservoir 14 increases. Under such condition, the effect of the engine suction pulsation, etc. is very minor and the fuel supply quantity can be controlled by the negative pressure which substantially corresponds to the quantity of suction air.

Since the respective nozzles project into the control chamber 9, the fuel is not allowed to attach on the wall of said chamber, nor is the fuel sucked from the main and auxiliary control nozzles 17, 18. Further, the total quantity of the fuel supplied through the low speed fuel passage 21 and the fuel supplied through the main fuel passage 15 can be increased with the quantity of suction air of the engine increasing.

As stated previously, it is impossible, with the fluidic logical device only, to maintain the fuel quantity basically in proportional relation to the increasing quantity of the suction air over a wide range of the engine operation. In the present invention, a fuel supply line for use in the low speed operation range of the engine is provided. Therefore, by suitably adjusting the relationship between the range within which the fuel supply line is used and the range within which the fluidic device operates, it is possible to obtain a suitable fuel flow characteristic over the range from the low speed operation to the intermediate speed operation of the engine. For obtaining a suitable fuel flow characteristic for the high speed operation range of the engine, a correction must be made and various methods can be considered to effect such correction. One of the methods is to draw the line of the top edge of the partition member 12 into a suitable configuration, e.g. into a curved line as indicated by B in FIG. 5, whereby the tendency of the fuel flow rate becoming excessively high in the high speed region of the engine can be inhibited. Another method is to provide a main restriction 25 in the main fuel passage 15 and return a part of the fuel to the fuel tank 7 through the second fuel return passage 30 which is open into said main fuel passage 15 at a point upstream of said main restriction 25. In this case, the Venturi negative pressure acts in the downstream of the main restriction 25 and this negative pressure becomes large as the fuel flow rate increases, so that the flow resistance created by said main restriction 25 increases and hence the ratio of the fuel entering the second return passage 30 increases.

The fuel flow characteristic may also be corrected by suitably selecting the sizes of the vent nozzle 16 and the air bleed 28.

By employing these corrective means either singly or in combination, a suitable relationship between the fuel flow rate and the suction air quantity can be established over a wide operational range of the engine.

In the manner described, it is possible to supply fuel to the engine in a quantity proportional to the quantity of suction air within the range from the start or idling state to the high speed operation of the engine.

Of course, the fuel flow characteristic required is not so simple as stated above and a correction to the concentration of the fuel-air mixture becomes necessary when the engine load becomes excessively large or when the engine speed is to be accelerated or decelerated or when the engine is to be started at a low temperature. However, such correction can easily be made by changing the manner of imparting the control pressure, as long as the basic relationship between the quantity of suction air and the quantity of fuel supplied to the engine is established.

In some types of engine, the fluctuation of the negative pressure in the suction pipe is relatively small. In the case of such engines, only the Venturi negative pressure may be used as a control signal. It is also to be understood that the by-pass line may occasionally be omitted, even when the low speed fuel line is provided.

Figure 6:
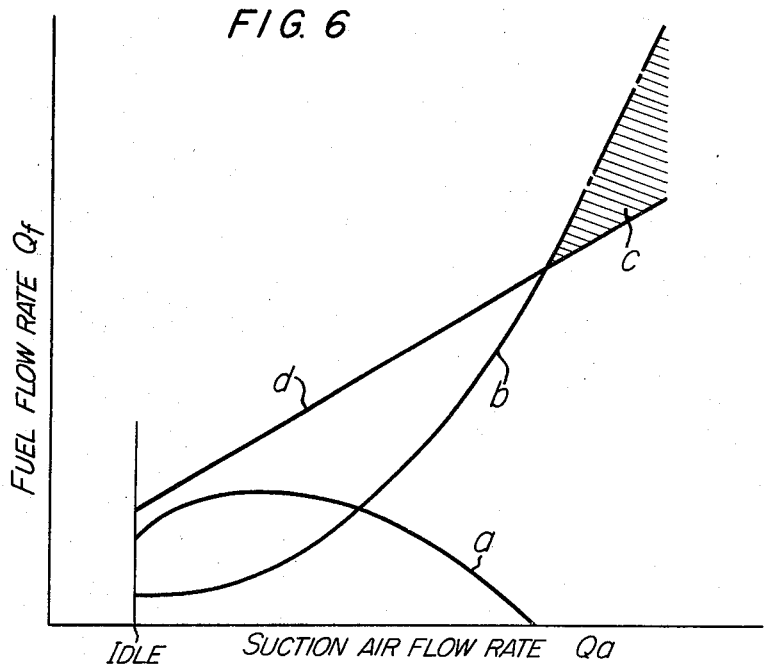
FIG. 6 is a diagram showing the relationship between the suction air quantity and the fuel flow rate in the carburetor of FIGS. 4 and 5.
Figure 7:
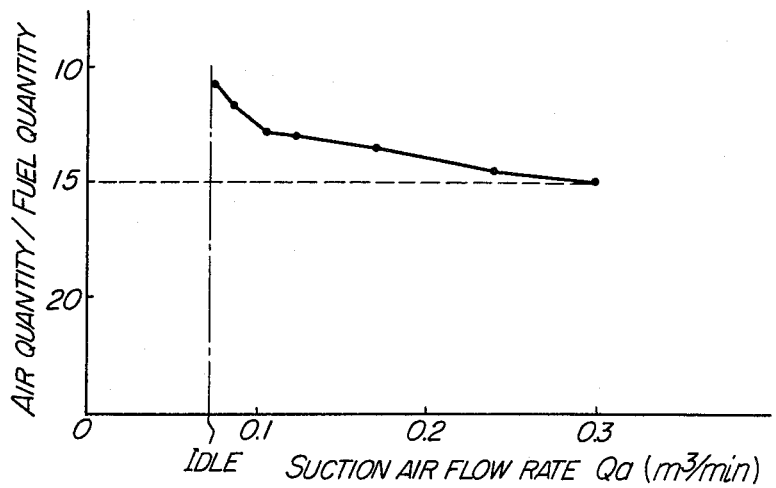
FIG. 7 is a diagram showing the characteristics of the carburetor of FIGS. 4 and 5 as measured by mounting it on an actual engine.

FIG. 6 exemplifies the relationship between the air flow rate $Qa$ and the fuel flow rate $Qf$ in a carburetor according to this invention. In the diagram of FIG. 6, the line $a$ represents the relationship established when the fuel is supplied through the low speed fuel supply line, and the line $b$ represents the relationship established when the fuel is supplied through the main fuel supply line. The area $c$ represents a portion of the fuel flow rate according to the line $b$ which is corrected by the configuration of the line of the top edge of the partition member 12, the main restriction 25, the secondary return passage 30 or the air bleed 28, and the line $d$ represents the relationship established by the carburetor as a whole. FIG. 7 shows the characteristic curve of a carburetor embodying the present invention, as measured by mounting it on an engine of 42 cc in displacement. Such characteristic can readily be obtained by adjusting the suction air flow rate vs. fuel flow rate relationship represented by the line $d$ in FIG. 6. It will be understood from the characteristic curve that the air-fuel ratio is continuously decreased as the state of the engine is shifted from idling to a high speed operation.

As described above, according to the present invention it is possible to obtain a suitable air-fuel ratio from idling to a high speed operation, within the basic relationship between the air quantity and the fuel quantity to be supplied to the engine and without resorting to any moving part. Therefore, the carburetor of the invention is highly reliable in performance, very simple in construction as a whole and can be produced at low costs.

What is claimed is:

1. A carburetor comprising a carburetor body, a control chamber formed either integrally with or separately from said carburetor body, a fuel nozzle projecting into one end portion of said control chamber and constituting an end portion of a fuel supply conduit communicating with a fuel tank, a partition member provided in the other end portion of said control chamber in opposed relation to said fuel nozzle for dividing said portion into a fuel return reservoir and a fuel supply reservoir, said fuel supply reservoir being in communication with a Venturi within the air passage of the carburetor through a main fuel passage, a control nozzle projecting into said control chamber with its axis extending in crossing or adjacent relation to the axis of said fuel nozzle within said control chamber, an auxiliary control nozzle projecting into said control chamber at a location closer to said fuel nozzle than said control nozzle and a vent nozzle provided in said control chamber at a location opposite to said control nozzle and auxiliary control nozzle, said control nozzle being in communication with said Venturi or a portion of the air passage in the proximity of said Venturi, said auxiliary control nozzle being in communication with a portion of the air passage in the proximity of a throttle valve through a low speed fuel supply passage which is in communication with said fuel supply conduit and said vent nozzle being in communication with a portion of the air passage where the atmospheric pressure or a pressure approximate thereto will act.

2. A carburetor as defined in claim 1, wherein a main restriction is provided in said main fuel passage and a fuel return passage communicating with the fuel tank is provided to open into said main fuel passage at a location upstream of said main restriction.

3. A carburetor as defined in claim 1, wherein said low speed fuel passage is communicated with an idle port which is open into the air passage at a location immediately downstream of the throttle valve and with a by-pass port which is open into said air passage at a location immediately upstream of said throttle valve, and an idle adjusting screw is provided in said low speed fuel passage.

4. A carburetor as defined in claim 1, wherein said control chamber is shaped into a rectangle or a shape similar thereto in cross-section and the line of the top edge of said partition member is traced such that the area of the fuel supply reservoir projects into the area of the fuel return reservoir.

5. A carburetor as defined in claim 1, wherein an air bleed is provided in said main fuel passage.

* * * * *